United States Patent [19]

Kawaguchi

[11] Patent Number: 5,082,912
[45] Date of Patent: Jan. 21, 1992

[54] POLYMER-TYPE POLYMERIZATION INITIATOR

[75] Inventor: Toru Kawaguchi, Gifu, Japan

[73] Assignee: Tomei Sangyo Kabushiki Kaisha, Japan

[21] Appl. No.: 639,336

[22] Filed: Dec. 11, 1990

[30] Foreign Application Priority Data

Dec. 14, 1989 [JP] Japan .................................. 1-324235

[51] Int. Cl.$^5$ ............................................ C08F 26/10
[52] U.S. Cl. ..................... 526/264; 526/242; 525/283; 525/296
[58] Field of Search .......................................... 526/264

[56] References Cited

U.S. PATENT DOCUMENTS 2,980,654 4/1961 Perry .................. 526/264
2,999,853 9/1961 Perry .................. 526/264

FOREIGN PATENT DOCUMENTS 46-34100 10/1971 Japan .
1041088 9/1964 United Kingdom .

OTHER PUBLICATIONS

T. Sato et al., J. Macromol. Sci.-Chem. A23, 993–1005 (1986).
Chem. Abstr. 76:86426x (1972).
Chem. Abstr. 105:43502u (1986).
Chem. Abstr. 112:57795u (1990).
"Polymerization of Methacrylic Monomer Functioning as Initiator," *Polymer Reprints*, by B. Yamada et al., Japan, vol. 33, No. 6 (1984).

*Primary Examiner*—Joseph L. Schofer
*Assistant Examiner*—M. Nagumo
*Attorney, Agent, or Firm*—Parkhurst, Wendel & Rossi

[57] ABSTRACT

A polymer-type polymerization initiator produced by copolymerizing (A) 40 to 60 mole % of an N-vinyllactam and (B) 60 to 40 mole % of at least one fumarate containing a peroxy group, the peroxy-fumarate (B) being represented by the following formula:

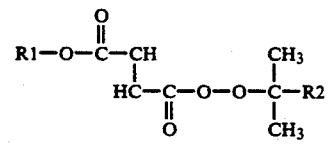

wherein R1 is a linear alkyl, branched alkyl or cycloalkyl group containing not more than 18 carbon atoms, or an aromatic hydrocarbon group containing 6 to 18 carbon atoms; and R2 is a linear alkyl, branched alkyl or cycloalkyl group containing not more than 13 carbon atoms, or a phenyl group.

The peroxy-fumarate (b1) may be used in combination with (b2) at least one diester of fumaric acid selected from the group consisting of alkyl fluoroalkyl fumarate, alkyl silicon-containing-alkyl fumarate, fluoroalkyl, silicon-containing-alkyl fumarate, bis(fluoroalkyl) fumarate, and bis(silicon-containing-alkyl) fumarate, a mole ratio of the peroxy-fumarate to the diester of fumaric acid falling within a range of 9 to 1 to 1 to 9.

3 Claims, 3 Drawing Sheets

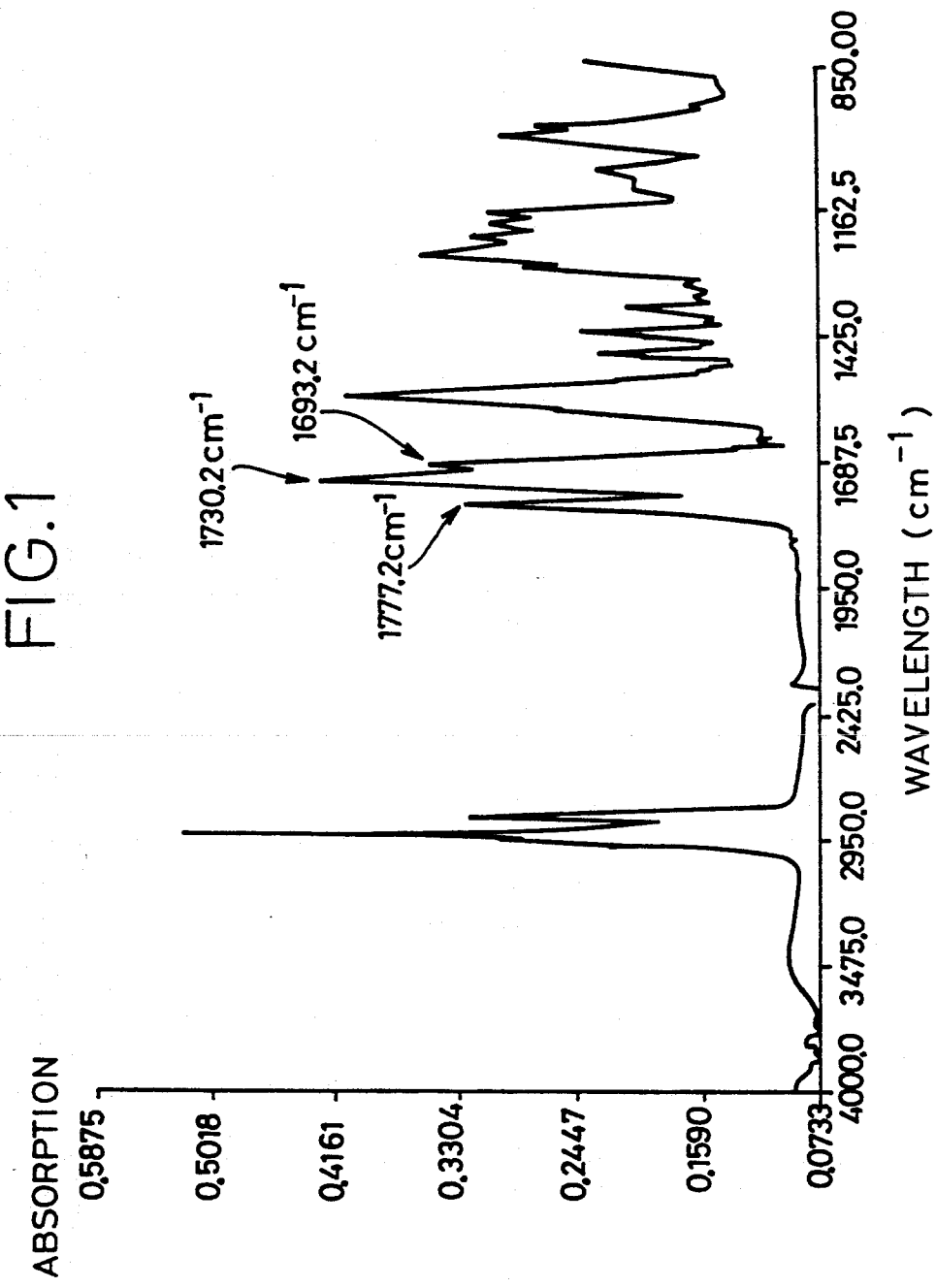

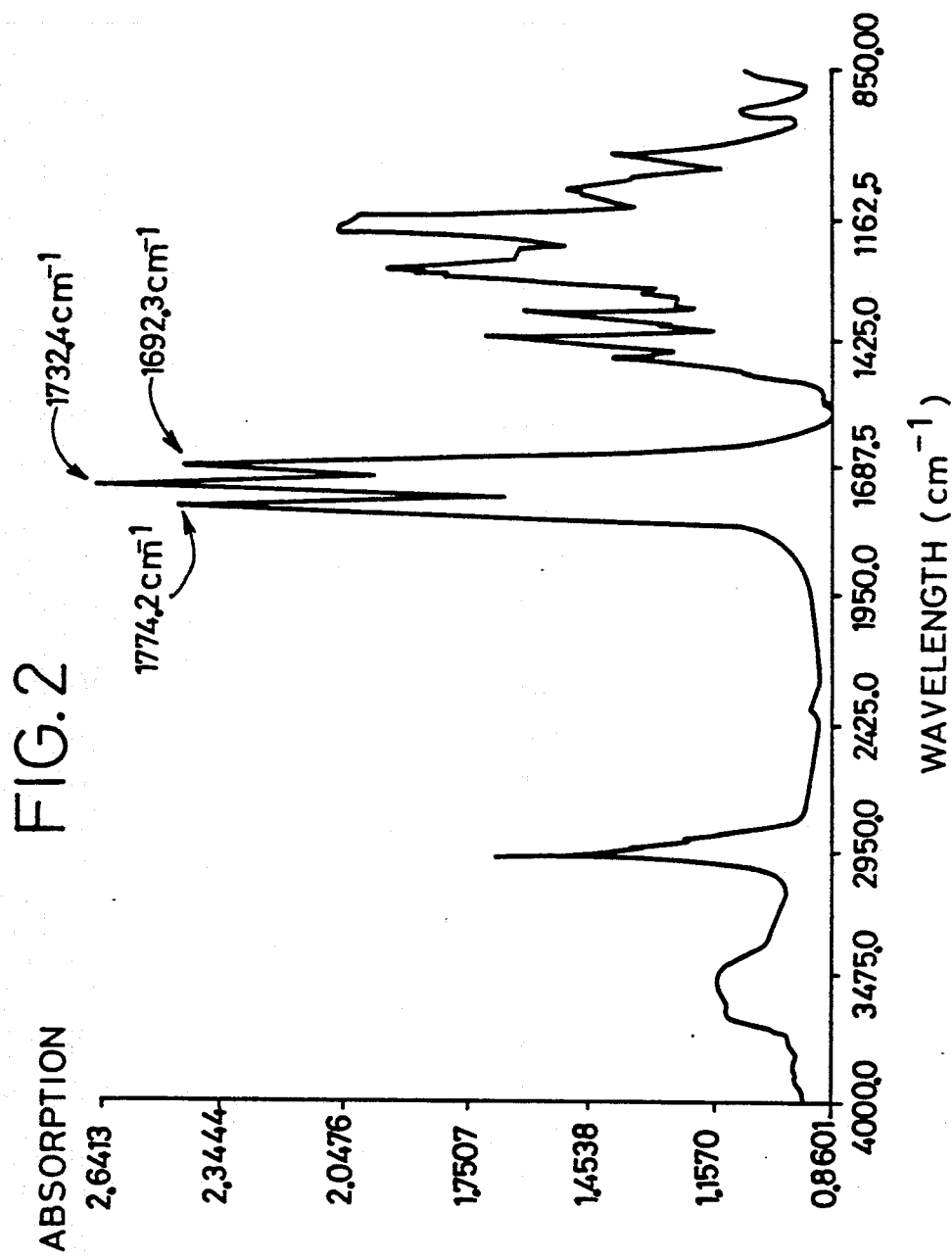

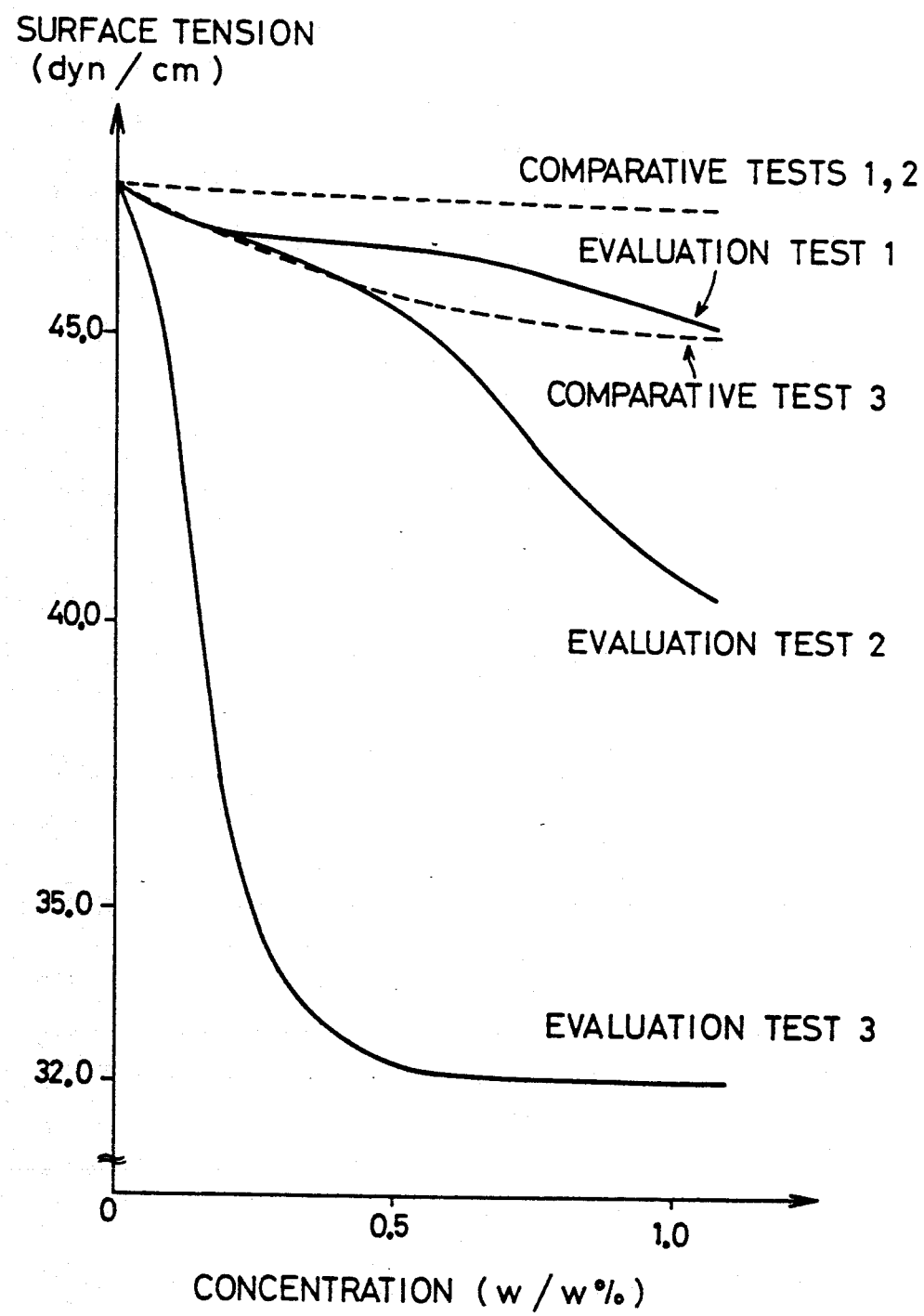

POLYMER-TYPE POLYMERIZATION INITIATOR

BACKGROUND OF THE INVENTION

1. Field of the Invention

The present invention generally relates to a polymer-type polymerization initiator and particularly to such a polymer-type polymerization initiator suitable as a component or material for producing a surface active polymer which is useful as coating agent, surface modifying agent, polymeric compatibilizer, etc.

2. Related Art Statement

In recent years, various sorts of polymers having various properties and functions have been needed. In this background, it has been considered to use a block copolymer or a graft copolymer for modifying a polymer, or enhancing compatibility of one sort of polymer and another sort of polymer, by utilizing the specific properties of the copolymer.

Known graft copolymer-producing processes are such as: i) polymerizing one sort of monomer in the presence of a polymer made from another sort of monomer by utilizing the chain transfer reaction, and thereby producing a graft copolymer (chain transfer method), ii) oxidizing a main-chain polymer with oxygen or ozone to produce active sites in the main-chain polymer, and utilizing the active sites for producing a graft copolymer (oxidation graft copolymerization method), iii) producing a graft copolymer by utilizing radiation (radiation graft copolymerization method), and iv) introducing unsaturated double bonds into a molecule of a polymer made from one sort of monomer, and copolymerizing the double bond-containing polymer with another sort of monomer (macromonomer method). However, the chain transfer method i) suffers from low degree of grafting and therefore does not provide a high-performance graft copolymer. The oxidation graft copolymerization method ii) suffers from high tendency of scission of the main-chain polymer due to the oxidation and, in addition, low degree of grafting up to about 10% only. The radiation graft copolymerization method iii) suffers from complicated operations since the method is carried out in vacuum or under an inert atmosphere. The macromonomer method iv) suffers from troublesomeness of production of the macromonomer and, additionally, high dependence of the degree of copolymerization on the molecular weight of the macromonomer.

For overcoming the above indicated problems, a method has been proposed, which provides a graft copolymer by utilizing a polymer-type polymerization initiator containing as a copolymerized component thereof an azo compound or peroxide compound with an unsaturated double bond capable of copolymerization. In such a method disclosed in "Polymer Preprints Japan", Vol. 33, p. 75, p.1059 and 1062, 1984, an azo compound having a methacryloyl group is used as a comonomer for producing a polymer-type polymerization initiator, and the initiator is used for producing a graft copolymer. However, in the case where a large amount of azo compound with an unsaturated double bond capable of copolymerization is used, crosslinking reaction tends to occur among the molecules. Accordingly, only a small amount of azo compound can be used, and therefore this method suffers from low degree of grafting. In addition, generally, an azo compound is an initiator of low efficiency, and this leads to reducing the degree of grafting.

Another method has been proposed, which produces a graft copolymer by utilizing a polymer-type polymerization initiator containing a peroxide group. In such a method disclosed in British Patent No. 1041088, styrene is grafted to copolymer (i.e., initiator) made from methyl methacrylate and t-butylperoxy methacrylate. In addition, Japanese Patent Application laid open for opposition purpose under Publication No. 46-34100 (1971) discloses a method for grafting methyl acrylate to copolymer (initiator) of styrene and di(t-butylperoxy) fumarate. Such polymer-type polymerization initiators are useful in producing a graft copolymer for improving compatibility of polystyrene and polymethyl acrylate. However, in the case where the polymerization initiators are used for producing a surface active polymer having both hydrophobic and hydrophilic sites and capable of, for example, modifying a hydrophobic surface into a hydrophilic surface, there arises a problem that those initiators are insoluble in a hydrophilic monomer, or a polymerization solvent including a hydrophilic monomer, because the initiators are highly hydrophobic. Therefore, this method suffers from difficulty of grafting of a hydrophilic monomer.

SUMMARY OF THE INVENTION

It is therefore an object of the present invention to provide a polymer-type polymerization initiator which is soluble in a hydrophilic monomer or a polymerization solvent including a hydrophilic monomer so that the initiator may be used for producing a hydrophobic/hydrophilic graft copolymer which is advantageously used for modifying a hydrophobic surface into a hydrophilic surface and which copolymer has high degree of grafting.

The Inventor has researched and studied for achieving the above indicated object, and found that a copolymer produced by copolymerization of an N-vinyllactam and a fumarate containing peroxy group (abbreviated to peroxy-fumarate), or a copolymer produced by copolymerization of an N-vinyllactam, a peroxy-fumarate and a specific diester of fumaric acid, is highly soluble in hydrophilic monomers of many sorts, or a polymerization solvent including a hydrophilic monomer, and that the copolymer, if combined with an appropriate hydrophilic monomer, provides a hydrophobic/hydrophilic graft copolymer having excellent surface active property. The present invention has been developed based on these findings.

According to a first aspect of the present invention, there is provided a binary polymer-type polymerization initiator produced by copolymerizing (A) 40 to 60 mole % of an N-vinyllactam and (B) 60 to 40 mole % of at least one peroxy-fumarate, the peroxy-fumarate (B) being represented by the following formula (I):

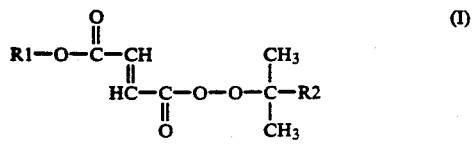

wherein R1 is a linear alkyl, branched alkyl or cycloalkyl group containing not more than 18 carbon atoms, or an aromatic hydrocarbon group containing 6 to 18 carbon atoms; and R2 is a linear alkyl, branched alkyl or cycloalkyl group containing not more than 13 carbon atoms, or a phenyl group.

According to a second aspect of the present invention, there is provided a ternary polymer-type polymerization initiator produced by copolymerizing (A) 40 to 60 mole % of an N-vinyllactam and (B) 60 to 40 mole % of a combination of (b1) at least one peroxy-fumarate represented by the above indicated formula (I), and (b2) at least one diester of fumaric acid selected from the group consisting of alkyl fluoroalkyl fumarate, alkyl silicon-containing-alkyl fumarate, fluoroalkyl silicon-containing-alkyl fumarate, bis(fluoroalkyl) fumarate, and bis(silicon-containing-alkyl) fumarate, a mole ratio of the at least one peroxy-fumarate to the at least one diester of fumaric acid falling within a range of 9 to 1 to 1 to 9.

BRIEF DESCRIPTION OF THE DRAWINGS

FIG. 1 is a graph showing a Fourier-transform infrared absorption spectrum (IR) of the polymer-type polymerization initiator of Example 1 in accordance with the present invention;

FIG. 2 is a graph showing a Fourier-transform infrared absorption spectrum (IR) of the polymer-type polymerization initiator of Example 2 in accordance with the present invention; and FIG. 3 is a graph showing surface tension values of the solutions at different concentrations of each of the polymers measured in Evaluation Tests 1 through 3 and Comparative Tests 1 through 3.

DETAILED DESCRIPTION OF THE INVENTION

The above and optional objects, features and advantages of the present invention will be better understood by reading the following detailed description of the invention.

In the present invention, an N-vinyllactam is used for producing the binary or ternary polymer-type polymerization initiator. The following N-vinyllactams are preferably used in the present invention: N-vinyl-2-pyrrolidone, N-vinyl-3-methyl-2-pyrrolidone, N-vinyl-5-methyl-2-pyrrolidone, N-vinyl-3, 3, 5-trimethyl-2-pyrrolidone, N-vinyl-5-phenyl-2-pyrrolidone, N-vinyl-3-benzyl-2-pyrrolidone, N-vinylpiperidone, N-vinylcaprolactam, and N-vinylcapryllactam. Each of the N-vinyllactams may be used either alone or in combination with one or more of the other N-vinyllactams. Above all, the N-vinyl-2-pyrrolidone is the most recommendable since the compound is a common monomer and is easily available.

In addition, in the present invention, the peroxy-fumarate represented by the above indicated formula (I) is used for copolymerization with the N-vinyllactam. The peroxy-fumarate contains a peroxy group, —O—O—, in the molecule thereof. The following peroxy-fumarates are preferably used in the present invention: t-butylperoxy methyl fumarate, t-butylperoxy ethyl fumarate, t-butylperoxy isopropyl fumarate, t-butylperoxy n-butyl fumarate, t-butylperoxy n-pentyl fumarate, t-butylperoxy n-hexyl fumarate, t-butylperoxy n-octyl fumarate, t-butylperoxy 2-ethylhexyl fumarate, t-butylperoxy lauryl fumarate, t-butylperoxy stearyl fumarate, t-butylperoxy phenyl fumarate, t-butylperoxy cyclohexyl fumarate, t-pentylperoxy methyl fumarate, t-pentylperoxy ethyl fumarate, t-pentylperoxy isopropyl fumarate, t-pentylperoxy n-butyl fumarate, t-pentylperoxy n-pentyl fumarate, t-pentylperoxy n-hexyl fumarate, t-pentylperoxy n-octyl fumarate, t-pentylperoxy 2-ethylhexyl fumarate, t-pentylperoxy lauryl fumarate, t-pentylperoxy stearyl fumarate, t-pentylperoxy phenyl fumarate, t-hexylperoxy methyl fumarate, t-hexylperoxy ethyl fumarate, t-hexylperoxy isopropyl fumarate, t-hexylperoxy n-butyl fumarate, t-hexylperoxy n-pentyl fumarate, t-hexylperoxy n-hexyl fumarate, t-hexylperoxy n-octyl fumarate, t-hexylperoxy 2-ethylhexyl fumarate, t-hexylperoxy lauryl fumarate, t-hexylperoxy stearyl fumarate, t-cumylperoxy methyl fumarate, t-cumylperoxy ethyl fumarate, t-cumylperoxy isopropyl fumarate, t-cumylperoxy n-butyl fumarate, t-cumylperoxy n-pentyl fumarate, t-cumylperoxy n-hexyl fumarate, t-cumylperoxy n-octyl fumarate, t-cumylperoxy 2-ethylhexyl fumarate, t-cumylperoxy lauryl fumarate, and t-cumylperoxy stearyl fumarate. Each of the peroxy-fumarates may be used either alone or in combination with one or more of the other peroxy-fumarates.

The binary polymer-type polymerization initiator in accordance with the present invention is produced by copolymerizing the above indicated two components or monomers, namely, N-vinyllactam and peroxy-fumarate, in the form of a mixture thereof.

In addition, the ternary polymer-type polymerization initiator in accordance with the present invention is produced by copolymerizing the above indicated two monomers, namely, N-vinyllactam and peroxy-fumarate, together with a diester of fumaric acid selected from the group consisting of (i) alkyl fluoroalkyl fumarate, (ii) alkyl silicon-containing-alkyl fumarate, (iii) fluoroalkyl silicon-containing-alkyl fumarate, (iv) bis(fluoroalkyl) fumarate, and (v) bis(silicon-containing-alkyl) fumarate. Each of the diesters (i) through (v) may be used alone or in combination with one or more of the other diesters.

The alkyl fluoroalkyl fumarate (i) represented by the following formula (II), is preferably used in the present invention:

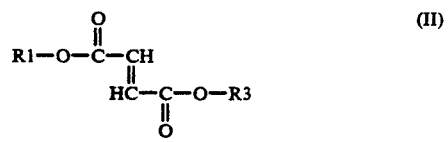

(II)

wherein R1 is the same as previously indicated; and R3 is —$(CH_2)_k$—$C_aH_bF_{2a+1-b}$ wherein a is an integer of 1 to 21, b is 0 or 1, and k is an integer of 0 to 3.

Examples of the alkyl fluoroalkyl fumarate (II) are as follows: methyl trifluoroethyl fumarate, ethyl trifluoroethyl fumarate, isopropyl trifluoroethyl fumarate, octyl trifluoroethyl fumarate, phenyl trifluoroethyl fumarate, methyl hexafluoroisopropyl fumarate, ethyl hexafluoroisopropyl fumarate, isopropyl hexafluoroisopropyl fumarate, octyl hexafluoroisopropyl fumarate, cyclohexyl hexafluoroisopropyl fumarate, phenyl hexafluoroisopropyl fumarate, methyl octafluoropentyl fumarate, ethyl octafluoropentyl fumarate, isopropyl octafluoropentyl fumarate, octyl octafluoropentyl fumarate, cyclohexyl octafluoropentyl fumarate, and phenyl octafluoropentyl fumarate.

The alkyl silicon-containing-alkyl fumarate (ii) represented by the following formula (III) is preferably used in the present invention:

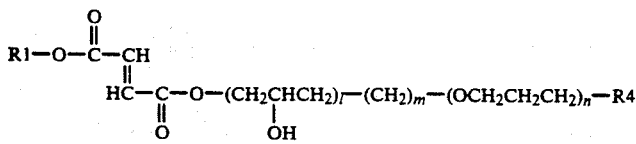
(III)

wherein R1 is the same as previously indicated; R4 is

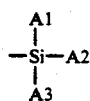

wherein each of A1, A2 and A3 is selected from —CH₃ and —O—Si(CH₃)₃; l is 0 or 1; m is an integer of 1 to 3; and n is 0 or 1 (l is 0 in the particular case where n is 1).

Examples of the alkyl silicon-containing-alkyl fumarate (III) are as follows: methyl trimethylsilyl-propyl fumarate, ethyl trimethylsilyl-propyl fumarate, isopropyl trimethylsilyl-propyl fumarate, octyl trimethylsilyl-propyl fumarate, cyclohexyl trimethylsilyl-propyl fumarate, phenyl trimethylsilyl-propyl fumarate, methyl pentamethyldisiloxanyl-propyl fumarate, ethyl pentamethyldisiloxanyl-propyl fumarate, isopropyl pentamethyldisiloxanyl-propyl fumarate, octyl pentamethyldisiloxanyl-propyl fumarate, cyclohexyl pentamethyldisiloxanyl-propyl fumarate, phenyl pentamethyldisiloxanyl-propyl fumarate, methyl methyl-bis(trimethylsilyloxy)silyl-propyl fumarate, ethyl methyl-bis(-trimethylsilyloxy)silyl-propyl fumarate, isopropyl methyl-bis(trimethylsilyloxy(silyl-propyl fumarate, octyl methyl-bis(trimethylsilyloxy)silyl-propyl fumarate, cyclohexyl methyl-bis(trimethylsilyloxy)silyl-propyl fumarate, phenyl methyl-bis(trimethylsilyloxy)silyl-propyl fumarate, methyl tris(trimethylsilyloxy)silyl-propyl fumarate, ethyl tris(trimethylsilyloxy)silyl-propyl fumarate, isopropyl tris(trimethylsilyloxy)silyl-propyl fumarate, octyl tris(trimethylsilyloxy)silyl-propyl fumarate, cyclohexyl tris(trimethylsilyloxy)silyl-propyl fumarate, phenyl tris(trimethylsilyloxy)silyl-propyl fumarate, methyl pentamethyldisiloxanyl-propyloxyethyl fumarate, ethyl pentamethyldisiloxanyl-propyloxyethyl fumarate, isopropyl pentamethyldisiloxanyl-propyloxyethyl fumarate, octyl pentamethyldisiloxanyl-propyloxyethyl fumarate, cyclohexyl pentamethyldisiloxanyl-propyloxyethyl fumarate, and phenyl pentamethyldisiloxanyl-propyloxyethyl fumarate.

The fluoroalkyl silicon-containing-alkyl fumarate (iii) represented by the following formula (IV) is preferably used in the present invention:

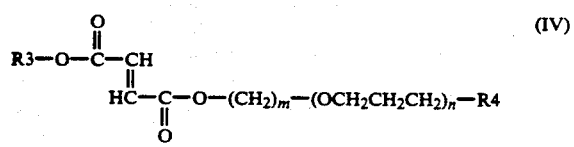
(IV)

wherein R3, R4, m, and n are the same as previously indicated.

Examples of the fluoroalkyl silicon-containing-alkyl fumarate (IV) are as follows: trifluoroethyl trimethylsilylpropyl fumarate, hexafluoroisopropyl trimethylsilyl-propyl fumarate, octafluoropentyl trimethylsilyl-propyl fumarate, trifluoroethyl pentamethyldisiloxanyl-propyl fumarate, hexafluoroisopropyl pentamethyldisiloxanyl-propyl fumarate, octafluoropentyl pentamethyldisiloxanyl-propyl fumarate, trifluoroethyl methyl-bis(trimethylsilyloxy)silyl-propyl fumarate, hexafluoroisopropyl methyl-bis(trimethylsilyloxy)silyl-propyl fumarate, octafluoropentyl methyl-bis(trimethylsilyloxy)silyl-propyl fumarate, trifluoroethyl tris(trimethylsilyloxy)silyl-propyl fumarate, hexafluoroisopropyl tris(trimethylsilyloxy)silyl-propyl fumarate, octafluoropentyl tris(trimethylsilyloxy)silyl-propyl fumarate, trifluoroethyl pentamethyldisiloxanyl-propyloxyethyl fumarate, hexafluoroisopropyl pentamethyldisiloxanyl-propyloxyethyl fumarate, and octafluoropentyl pentamethyldisiloxanyl-propyloxyethyl fumarate.

The bis(fluoroalkyl) fumarate (iv) represented by the following formula (V) is preferably used in the present invention:

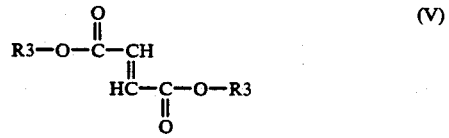
(V)

wherein R3 is the same as previously indicated.

Examples of the bis(fluoroalkyl) fumarate (V) are as follows: bis(trifluoroethyl) fumarate, bis(tetrafluoropropyl) fumarate, bis(hexafluoroisopropyl) fumarate, and bis(octafluoropentyl) fumarate.

The bis(silicon-containing alkyl) fumarate (v) represented by the following formula (VI) is preferably used in the present invention:

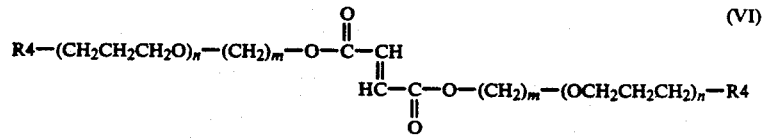
(VI)

wherein R4, m, and n is the same as previously indicated.

Examples of the bis(silicon-containing alkyl) fumarate (VI) are as follows: bis(trimethylsilylpropyl) fumarate, bis(pentamethyldisiloxanyl-ppropyl) fumarate, bis(-pentamethyldisloxanyl-propyloxyethyl) fumarate, bis(-methylbis(trimthylsilyloxy)silyl-propyl) fumarate, and bis(tris(trimethylsilyloxy)silylpropyl) fumarate.

In the present invention, the binary polymer-type polymerization initiator is produced by copolymerizing 40 to 60 mole % of the N-vinyllactam and 60 to 40 mole % of the peroxy-fumarate represented by the formula (I). The peroxy-fumarate has properties that it is rather difficult to polymerize the monomer alone but that the monomer is advantageously copolymerizable with the N-vinyllactam. In particular, it is noted that the copolymer made by copolymerizing the two monomers, namely, peroxy-fumarate and N-vinyllactam, has high degree of alternation of the two monomers in the molecule. However, if the proportion of the N-vinyllactam is below the lower limit, 40 mole %, namely if the proportion of the peroxy-fumarate exceeds the upper limit, 60 mole %, an excessive amount of peroxy-fumarate remains without copolymerizing with N-vinyllactam. This is not economical. On the other hand, if the proportion of the N-vinyllactam exceeds the upper limit, 60 mole %, namely, if the proportion of the peroxy-fumarate is below the lower limit, 40 mole %, the copolymerization tends to produce a mixture of the binary copolymer of N-vinyllactam and peroxy-fumarate, and homopolymer of the N-vinyllactam. In this case, it is difficult to separate and/or purify the copolymer of N-vinyllactam and peroxy-fumarate, namely, binary polymer-type initiator in accordance with the present invention, from the homopolymer of N-vinyllactam. For these reasons, it is preferred that the proportion of N-vinyllactam to that of peroxy-fumarate fall within the range of from 40 mole % to 60 mole %, to 60 mole % to 40 mole %. It is the most recommendable that 50 mole % of N-vinyllactam be reacted with 50 mole % of peroxy-fumarate.

In addition, the ternary polymer-type polymerization initiator in accordance with the present invention is produced by copolymerizing 40 to 60 mole % of the N-vinyllactam with 60 to 40 mole % of a combination of the peroxy-fumarate represented by the formula (I) and the previously indicated diester of fumaric acid represented by the formula (II) to (VI), the mole ratio of the peroxy-fumarate to the diester of fumaric acid falling within the range of 9 to 1 to 1 to 9. Each of the diesters of fumaric acid (II) through (VI) has properties similar to those of the peroxy-fumarate (I), namely, that it is rather difficult to polymerize the monomer alone but that the monomer is advantageously copolymerizable with the N-vinyllactam. Similarly, it is noted that the copolymer made by copolymerizing the three monomers has high degree of alternation of N-vinyllactam and peroxy-fumarate or diester of fumaric acid. However, if the proportion of the N-vinyllactam is below the lower limit, 40 mole %, namely if the proportion of the peroxy-fumarate and diester of fumaric acid exceeds the upper limit, 60 mole %, an excessive amount of peroxy-fumarate and/or diester of fumaric acid remains without reacting with N-vinyllactam. This is not economical. On the other hand, if the proportion of the N-vinyllactam exceeds the upper limit, 60 mole %, namely, if the proportion of the peroxy-fumarate and diester of fumaric acid is below the lower limit, 40 mole %, the copplymerization tends to produce a mixture of the ternary polymer of N-vinyllactam, peroxy-fumarate and diester of fumaric acid, and homopolymer of the N-vinyllactam. In this case, it is difficult to separate and/or purify the polymer of N-vinyllactam, peroxy-fumarate, and diester of fumaric acid, namely, ternary polymer-type polymerization initiator, from the homopolymer of N-vinyllactam. For these reasons, it is preferred that the proportion of N-vinyllactam to that of peroxy-fumarate and diester of fumaric acid fall within the range of from 40 mole % to 60 mole %, to 60 mole % to 40 mole %. It is the most recommendable that 50 mole % of N-vinyllactam be reacted with 50 mole % of peroxy-fumarate and diester of fumaric acid.

If the proportion of the peroxy-fumarate to that of the diester of fumaric acid is below the lower limit, 1 to 9 in mole ratio, the ternary polymer-type polymerization initiator tends to produce a graft copolymer which suffers from low degree of grafting. On the other hand, if the proportion of the peroxy-fumarate to that of the diester of fumaric acid exceeds the upper limit, 9 to 1 in mole ratio, then the proportion of the diester of fumaric acid is too low to give significant hydrophobic property to the ternary polymer-type polymerization initiator produced. The units of diester of fumaric acid in the graft copolymer function as hydrophobic sites for the polymer-type polymerization initiator. Therefore, it is required that the mole ratio of the peroxy-fumarate to the diester of fumaric acid fall within the range of from 9 to 1, to 1 to 9.

The binary or ternary polymer-type polymerization initiator in accordance with the present invention is easily produced by a conventional radical polymerization method using a common radical polymerization initiator; such as bulk polymerization, solution polymerization, suspension polymerization, and emulsion polymerization.

In addition, it is recommended that the temperature at which the polymer-type polymerization initiator is produced fall within the range of about 0° to about 60° C., at which the peroxy group contained in the peroxy-fumarate is prevented from decomposition. A radical polymerization initiator that may be used at the temperature range is preferably selected from (i) azo compounds such as 2, 2'-azobis(4-methoxy-2, 4-dimethylvaleronitrile), 2, 2'-azobis(2-cyclopropylpropionitrile), 2, 2'-azobis(2, 4-dimethylvaleronitrile), and 2, 2'-azobisisobutyronitrile; and (ii) organic peroxides such as isobutylperoxide, diisopropylperoxy dicarbonate, and t-butylperoxy pivalate. Each of the radical polymerization initiators may be used either alone or in combination with one or more of the other initiators. Further, it is preferred that about 0.01 to 5 parts by weight of the radical polymerization initiator be used for 100 parts by weight of all the monomers to be copolymerized.

The polymerization time is determined depending upon the polymerization temperature and radical polymerization initiator employed. The time is preferably selected at about 1 to 72 hours.

Preferably, the binary or ternary polymer-type polymerization initiator is produced so that the number average molecular weight of the initiator falls within the range of about 1,000 to about 1,000,000, more advantageously within the range of about 1,000 to about 10,000. If the molecular weight of the polymer-type polymerization initiator is below the lower limit, namely, about 1,000, the initiator tends to provide a graft copolymer which does not have the specific properties of the main-chain polymer. On the other hand, if the molecular weight exceeds the upper limit-namely, about 1,000,000, the polymerization initiator tends to providing a graft copolymer which has an excessively high molecular weight and has an insufficient solubility as a polymer-type surface-modifying agent.

As is apparent from the foregoing description, the binary or ternary polymer-type polymerization initiator in accordance with the present invention has the structural feature that the hydrophilic units of N-vinyllactam, and the hydrophobic site-containing units of peroxy-fumarate and optionally diester of fumaric acid, are alternately contained in the molecule. Therefore, the polymer-type polymerization initiator is soluble in various sorts of hydrophilic monomers and hydrophilic polymerization solvents, so that the initiator enables production of various sorts of hydrophobic/hydrophilic graft copolymers.

In addition, the polymer-type polymerization initiator in accordance with the present invention contains a number of peroxy groups in the molecule, which groups are not decomposed up to relatively high temperatures. Therefore, even after a first monomer (component A) is grafter to the single backbone of the initiator, a relatively large number of peroxide groups remain in the backbone without being reacted. Accordingly, a second monomer (component B) is grafted to the backbone, so as to produce a graft copolymer which contains the polymer chain A made from the first monomer units and the polymer chain B made from the second monomer units. This graft copolymer may be used as a high-performance polymer. In other words, the polymer-type polymerization initiator in accordance with the present invention may be used not only as a precursor for a hydrophobic/hydrophilic graft copolymer but also as a precursor for various high-performance polymers.

Hereinafter, there will be described some examples of the binary or ternary polymer-type polymerization initiator in accordance with the present invention. It is however to be understood that the present invention is by no means limited to the particularities of the examples.

EXAMPLE 1

0.31 g (0.0028 mole) of N-vinyl-2-pyrrolidone (abbreviated to NVP), 1.0 g (0.0028 mole) of t-butylperoxy lauryl fumarate (abbreviated to LF-PO), 0.002 g ($8.05 \times 10^{-6}$ mole) of 2, 2'-azobis(2, 4-dimethylvaleronitrile) (abbreviated to V-65), and 2 cc of tetrahydrofuran (abbreviated to THF) are put in a 50 ml glass ampule. The gas in the ampule is displaced by nitrogen gas, and the ampule is sealed. At 40° C., the copolymerization reaction is effected for 18 hours. After the completion of the copolymerization, the solution containing the copolymer produced is diluted by 30 cc of diethyl ether. The diluted solution is transferred to a separating funnel, and washed three times with distilled water. Subsequently, the layer of the ether is separated, dried on anhydrous magnesium sulfate, filtered, and subjected to reduced pressure so as to remove the ether. Thus, 1.23 g of extremely viscous residue, namely, copolymer is obtained. The yield is 93.9%. The Fourier-transform infra-red absorption spectrum (IR) of the copolymer is shown in the graph of FIG. 1.

The IR spectrum of FIG. 1 indicates disappearance of the characteristic absorption peak at 1629 $cm^{-1}$ due to the vinyl group of NVP and the characteristic absorption peak at 1643 $cm^{-1}$ due to the vinyl group of LF-PO. This means that the copolymerization has taken place. The Fourier transform IR spectrum of FIG. 1 has the characteristic absorption peaks at the bands of $\nu$ (wavelength) = 1690 to 1700 $cm^{-1}$, 1725 to 1735 $cm^{-1}$, and 1770 to 1780 $cm^{-1}$ due to the group,

of NVP, the group,

of the lauryl ester of LF-PO, and the group,

of the t-butylperoxy ester of LF-PO, respectively.

Thus, it is identified that the copolymer produced is the polymer-type polymerization initiator in accordance with the present invention.

EXAMPLE 2

1.02 g (0.0092 mole) of NVP, 1.98 g (0.0092 mole) of t-butylperoxy ethyl fumarate (abbreviated to EF-PO), 0.045 g (0.0002 mole) of V-65, and 1.82 g of THF are put in a 50 ml glass ampule. The gas in the ampule is displaced by nitrogen gas, and the ampule is sealed. At 40° C., the copolymerization reaction is effected for 18 hours. After the completion of the copolymerization, the solution containing the copolymer produced is poured in a large amount of n-hexane so as to precipitate the copolymer. The precipitated copolymer is separated by filtration, and dried. Thus, 2.70 g of polymer-type polymerization initiator in accordance with the present invention, is obtained. The yield is 90.0%. The Fourier-transform infra-red absorption spectrum (IR) of the copolymer is shown in FIG. 2.

The IR spectrum of FIG. 2 has the characteristic absorption peaks at the wavelength bands of $\nu = 1690$ to 1700 $cm^{-1}$, 1725 to 1735 $cm^{-1}$, and 1770 to 1780 $cm^{-1}$ due to the group,

of NVP, the group,

of the ethyl ester of EF-PO, and the group,

of the t-butylperoxy ester of EF-PO, respectively. Thus, it is identified that the copolymer obtained is the polymer-type polymerization initiator in accordance with the present invention.

EXAMPLES 3, 4, 5, 6, 7 AND 8

Like the composition of Example 2, each of the compositions of Examples 3 through 8, indicated in Table I, is copolymerized. The copolymer produced is treated and purified so as to obtain the polymer-type polymerization initiator in accordance with the present invention. The IR spectrum of each polymerization initiator indicates that the monomers used have been introduced into the molecule.

Table II shows the compositions used for Evaluation Tests 1, 2, and 3. The compositions contain the common monomer, 2-HEMA. Each of the compositions is put in a 50 ml glass ampule. The gas in the ampule is displaced by nitrogen gas, and the ampule is sealed. The copolymerization reaction is effected at 80° C. for 18 hours and subsequently at 115° C. for 2 hours. After the completion of the copolymerization, the solution containing the copolymer produced is diluted with methanol, and then poured in a mass of diethyl ether so as to precipitate the copolymer.

The precipitated copolymer is separated by filtration,

TABLE I

| | MONOMER COMPOSITION | | | | | | |
|---|---|---|---|---|---|---|---|
| | NVP | EF—PO | DF$_8$F | Me—S$_2$F | V-65 | THF | YIELD |
| EXAMPLE 3 | 0.85 g (50 mole %) | 1.32 g (40 mole %) | 0.83 g (10 mole %) | — | 0.039 g | 1.82 g | 87.6% |
| EXAMPLE 4 | 0.73 g (50 mole %) | 0.85 g (30 mole %) | 1.43 g (20 mole %) | — | 0.033 g | 1.82 g | 87.7% |
| EXAMPLE 5 | 0.64 g (50 mole %) | 0.50 g (20 mole %) | 1.87 g (30 mole %) | — | 0.028 g | 1.82 g | 91.4% |
| EXAMPLE 6 | 0.96 g (50 mole %) | 1.49 g (40 mole %) | — | 0.55 g (10 mole %) | 0.043 g | 1.82 g | 88.6% |
| EXAMPLE 7 | 0.91 g (50 mole %) | 1.06 g (30 mole %) | — | 1.04 g (20 mole %) | 0.041 g | 1.82 g | 86.3% |
| EXAMPLE 8 | 0.86 g (50 mole %) | 0.67 g (20 mole %) | — | 1.47 g (30 mole %) | 0.038 g | 1.82 g | 85.7% |

NVP; N-vinyl-2-pyrrolidone
EF—PO; t-butylperoxy ethyl fumarate
DF$_8$F; bis(octafluoropentyl) fumarate
Me—S$_2$F; methyl pentamethyldisiloxanyl-propyl fumarate
V-65; 2, 2'-azobis(2, 4-dimethylvaleronitrile)
THF; tetrahydrofuran

EVALUATION TESTS 1, 2 AND 3

Production Of Graft Copolymer By Using Polymer-Type Polymerization Initiator And Evaluation Of The Graft Copolymer The polymer-type polymerization initiator of Example 1 (abbreviated to NF-PO<L>), the polymer-type polymerization initiator of Example 5 (abbreviated to NF$_8$F-PO<E>523), and the polymer-type polymerization initiator of Example 8 (abbreviated to NS$_2$F-PO<E>532), are used for graft copolymerization of 2-hydroxyethyl methacrylate (abbreviated to 2-HEMA).

and dried. Each of the copolymers produced is dissolved in ethylene glycol so as to obtain its solutions at different concentrations of 0.05, 0.1, 0.5, and 1.0 w/w%. The surface tension of each of the solutions is measured. The surface tension measurement is effected at room temperature by using "AUTOMATIC SURFACE TENSION METER, CBVP-A3" available from Kyowa Kaimen Kaguka Kabushiki Kaisha, Japan. The test results are shown in the graph of FIG. 3. All the polymer-type polymerization initiators are easily dissolved in both the monomer, namely, 2-HEMA and the polymerization solvent, namely, ethylene glycol monomethyl ether (MCS).

TABLE II

| | EVALUATION TEST 1 | EVALUATION TEST 2 | EVALUATION TEST 3 |
|---|---|---|---|
| MONOMER | 2-HEMA 2.0 g | 2-HEMA 2.0 g | 2-HEMA 2.0 g |
| POLYMELIZATION INITIATOR | NF—PO<L> 0.07 g | NF$_8$F—PO<E>523 0.12 g | NS$_2$F—PO<E> 532 0.15 g |
| CHAIN TRANSFER AGENT | DSH 0.02 g | DSH 0.02 g | DSH 0.02 g |
| PEROXIDE DECOMPOSITION ACCELERATOR | DMA 0.02 g | DMA 0.02 g | DMA 0.02 g |
| POLYMELIZATION | MCS 6.0 g | MCS 6.0 g | MCS 6.0 g |

TABLE II-continued

| | EVALUATION TEST 1 | EVALUATION TEST 2 | EVALUATION TEST 3 |
|---|---|---|---|
| SOLVENT | | | |

2-HEMA; 2-hydroxyethyl methacrylate
DSH; dodecylmercaptan
DMA; N, N-dimethyl aniline
MCS; ethylene glycol monomethyl ether

COMPARATIVE TESTS 1, 2 AND 3

Production Of Random Copolymer Of 2-HEMA And Hydrophobic Monomer And Evaluation Of The Random Copolymer The polymer-type polymerization initiators of Examples 1 through 3 contain a hydrophobic group in the molecule; lauryl group for NF-PO<L>, octafluorpentyl group for NF$_8$F-PO<E>523, and pentamethyldisiloxyanyl group for NS$_2$F-PO<E>532. First, 2-HEMA is subjected to random copolymerization with each of three hydrophobic monomers which contain the lauryl group, octafluoropentyl group, and pentamethyldisiloxanyl group, respectively, in such a manner that the three 2-HEMA random copolymers produced contain the randomly distributed hydrophobic groups equal in mole to the hydrophobic groups contained in the corresponding 2-HEMA graft copolymers which are produced by using the corresponding polymer-type polymerization initiators of Examples 1 through 3 and each of which contains graft poly 2-HEMA in the molecule. The thus obtained three 2-HEMA random copolymers are used for Comparative Tests 1, 2, and 3, respectively.

The 2HEMA random copolymers for Comparative Tests 1, 2, and 3 are prepared as follows: First, each of the compositions for Comparative Tests 1, 2, and 3, indicated in Table III, is put in a 50 ml glass ampule. The gas in the ampule is displaced by nitrogen gas, and the ampule is sealed. At 40° C., the copolymerization reaction is effected for 24 hours. After the completion of the copolymerization, the solution containing the copolymer produced is diluted with methanol, and then poured in a large amount of diethyl ether so as to precipitate the copolymer. The precipitated copolymer is separated by filtration, and dried. Each of the copolymers produced is dissolved in ethylene glycol so as to obtain its solutions at different concentrations of 0.05, 0.1, 0.5, and 1.0 w/w%. The surface tension of each of the solutions is measured, like Evaluation Tests 1 through 3. The test results are shown in the graph of FIG. 3, together with the results of Evaluation Tests 1 through 3.

TABLE III

| | COMPARATIVE TEST 1 | COMPARATIVE TEST 2 | COMPARATIVE TEST 3 |
|---|---|---|---|
| MONOMERS | 2-HEMA 1.961 g LMA 0.039 g | 2-HEMA 1.942 g 8FPA 0.058 g | 2-HEMA 1.944 g S$_2$MA 0.056 g |
| POLYMELIZATION INITIATOR | V-65 0.038 g | V-65 0.038 g | V-65 0.38 g |
| CHAIN TRANSFER AGENT | DSH 0.015 g | DSH 0.015 g | DSH 0.015 g |
| POLYMELIZATION SOLVENT | MCS 6.0 g | MCS 6.0 g | MCS 6.0 g |

TABLE III-continued

| | COMPARATIVE TEST 1 | COMPARATIVE TEST 2 | COMPARATIVE TEST 3 |
|---|---|---|---|
| SOLVENT | | | |

LMA; lauryl methacrylate
8FPA; octafluoropentyl methacrylate
S$_2$MA; pentamethyldisiloxanylpropyl methacrylate
V-65; 2, 2'-azobis(2, 4-dimethylvaleronitrile)

As is apparent from the graph of FIG. 3, the 2-HEMA graft copolymers obtained in Evaluation Tests 1 through 3 have more excellent surface tension-lowering property than the 2-HEMA random copolymers obtained in Comparative Tests 1 through 3, although the latter contain the same mole of hydrophobic groups as the corresponding 2-HEMA graft copolymers.

EVALUATION TEST 4

Production Of Graft Copolymer Containing Different Sorts Of Grafted Polymers And Evaluation Of The Graft Copolymer 5.0 g of styrene, 0.16 g of the polymer-type polymerization initiator of Example 2, and 5 cc of THF are put in a glass ampule. The gas in the ampule is displaced by nitrogen gas, and the ampule is sealed. At 80° C., the copolymerization reaction is effected for 4 hours. After the completion of the copolymerization, the ampule is opened, and the solution containing the copolymer produced is poured in a mass of methanol so as to precipitate the copolymer. The precipitated copolymer is separated by filtration, and dried. Thus, 0.8 g of styrene-grafted polymer is obtained.

Subsequently, 0.4 g of styrene-grafted polymer and 0.4 g of methyl methacrylate are dissolved in 2 ml of THF, and 0.06 g of N, N-dimethyl aniline is added thereto. This mixture is put in a 50 ml glass ampule. AS described above, the gas in the ampule is displaced by nitrogen gas, and the ampule is sealed. At 80° C., the copolymerization reaction is effected for 18 hours. After the completion of the copolymerization, the solution containing the copolymer produced is poured in a mass of methanol so as to precipitate the copolymer. The precipitated copolymer is separated by filtration, and dried. Thus, 0.6 g of copolymer is obtained.

0.01 g of the thus obtained copolymer is added to a two-layer solution consisting of 1 cc of acetonitrile in one layer and 1 cc of cyclohexane in the other layer, and the mixture is vigorously stirred. As a result, the acetonitrile and cyclohexane that normally form two separate layers, are emulsified. The emulsion is highly stable. The copolymer in question is a graft copolymer which simultaneously contains a polystyrene chain and a poly(methylmethacrylate) chain. The polystyrene chain is soluble in the cyclohexane, and simultaneously the poly(methylmethacrylate) chain is soluble in the acetonitrile. It is therefore considered that the copolymer acts as a surface active agent or surfactant for producing the stable emulsion.

For a comparative test, 0.005 g of polystyrene and 0.005 g of polymethyl methacrylate are added to a two-layer solution consisting of 1 cc of cyclohexane and 1 cc of acetonitrile, and thus obtained mixture is vigorously stirred. However, the mixture separates into the two layers soon after the stirring.

Thus, the polymer-type polymerization initiator in accordance with the present invention may be used for producing a graft copolymer containing different sorts of polymeric chains, by being used as a surface active agent.

As emerges from the foregoing, the binary or ternary polymer-type polymerization initiator in accordance with the present invention enables easy production of a hydrophobic/hyrophilic graft copolymer which acts as a surface active agent, and easy production of a surface active graft copolymer which contains different sorts of polymeric entities. In addition, it is considered that the polymer-type polymerization initiator in accordance with the present invention may be used as a component or material for producing various polymers having various functions.

While the present invention has been described with the particularities of the examples thereof, it is to be understood that the present invention may be embodied with various changes, improvements and modifications that may occur to those skilled in the art without departing from the scope and spirit of the invention defined in the appended claims.

What is claimed is:

1. A polymer-type polymerization initiator produced by copolymerizing (A) 40 to 60 mole % of an N-vinyllactam and (B) 60 to 40 mole % of at least one peroxy-fumarate, said peroxy-fumarate (B) being represented by the following formula:
wherein R1 is a linear alkyl, branched alkyl or cycloalkyl group containing not more than 18 carbon atoms, or an aromatic hydrocarbon group containing 6 to 18 carbon atoms; and R2 is a linear alkyl, branched alkyl or cycloalkyl group containing not more than 13 carbon atoms, or a phenyl group.

2. The polymer-type polymerization initiator as set forth in claim 1, wherein said N-vinyllactam is selected from the group consisting of N-vinyl-2pyrrolidone, N-vinyl-3-methyl-2-pyrrolidone, N-vinyl-5-methyl-2-pyrrolidone, N-vinyl-3, 3, 5-trimethyl-2-pyrrolidone, N-vinyl-5-phenyl-2-pyrrolidone, N-vinyl-3-benzyl-2-pyrrolidone, N-vinylpiperidone, N-vinylcaprolactam, and N-vinylcapryllactam.

3. The polymer-type polymerization initiator as set forth in claim 1, wherein said N-vinyllactam is N-vinyl-2-pyrrolidone.

* * * * *

UNITED STATES PATENT AND TRADEMARK OFFICE
CERTIFICATE OF CORRECTION

PATENT NO. : 5,082,912

DATED : January 21, 1992

INVENTOR(S) : Toru Kawaguchi

Page 1 of 2

It is certified that error appears in the above-identified patent and that said Letters Patent is hereby corrected as shown below:

On the title page, Abstract [57]

column 2, [57], please substitute the formula below for the one printed:

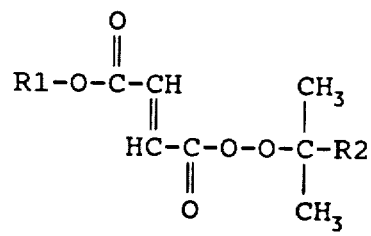

UNITED STATES PATENT AND TRADEMARK OFFICE
CERTIFICATE OF CORRECTION

PATENT NO. : 5,082,912

DATED : January 21, 1992

INVENTOR(S) : Toru Kawaguchi

It is certified that error appears in the above-identified patent and that said Letters Patent is hereby corrected as shown below:

column 16, after line 8, insert the formula:

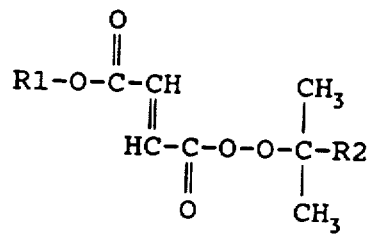

Signed and Sealed this

Fifth Day of October, 1993

BRUCE LEHMAN

*Attest:*

*Attesting Officer*  Commissioner of Patents and Trademarks